United States Patent [19]
Garchinsky

[11] 3,977,641
[45] Aug. 31, 1976

[54] ADJUSTABLE FITTING FOR RIGID ATTACHMENT OF TRAFFIC SIGNALS TO MOUNTING MEMBERS

[75] Inventor: John S. Garchinsky, Aldan, Pa.

[73] Assignee: Gar Design Research, Inc., Media, Pa.

[22] Filed: Dec. 11, 1974

[21] Appl. No.: 531,451

[52] U.S. Cl. ............................... 248/278; 403/84
[51] Int. Cl.² ................ F16M 13/00; F16M 13/02
[58] Field of Search .......... 248/279, 278, 284, 291; 285/DIG. 8; 403/84, 87, 93

[56] References Cited
UNITED STATES PATENTS

| | | | |
|---|---|---|---|
| 365,282 | 6/1887 | Tillman | 248/278 X |
| 1,134,462 | 4/1915 | Kendrick | 403/93 |
| 1,331,592 | 2/1920 | Smith | 248/291 X |
| 1,666,102 | 4/1928 | McCarthy | 248/278 |
| 2,334,809 | 11/1943 | Davis | 248/279 X |
| 2,974,920 | 3/1961 | Spaulding | 248/291 |

*Primary Examiner*—J. Franklin Foss
*Attorney, Agent, or Firm*—Nelson E. Kimmelman; Allan Ratner; Paul Maleson

[57] ABSTRACT

A hanger fitting usually made of metal includes two spaced, substantially parallel and planar rigid portions joined by at least two transverse portions. The planar portions have a first pair of threaded apertures formed generally perpendicular to the planes adapted to be engaged by a first corresponding pair of set screws for engaging a tongue or other member to which it is to be mounted. The transverse portions include a second pair of threaded apertures disposed generally transverse to the first pair and being adapted to be engaged by a second corresponding pair of set screws. Both pairs of set screws engage the tongue to which the fitting is to be mounted thereby to prevent movement of the fitting with respect to said member in two mutually perpendicular directions. The parallel portions also have a lower part adapted to be coupled to a signal assembly, or the like. In one form the lower part includes two lower rigid spaced, parallel portions having aligned transverse apertures; in another it includes a threaded nipple for directly engaging an aperture in the housing of the signal assembly itself.

24 Claims, 11 Drawing Figures

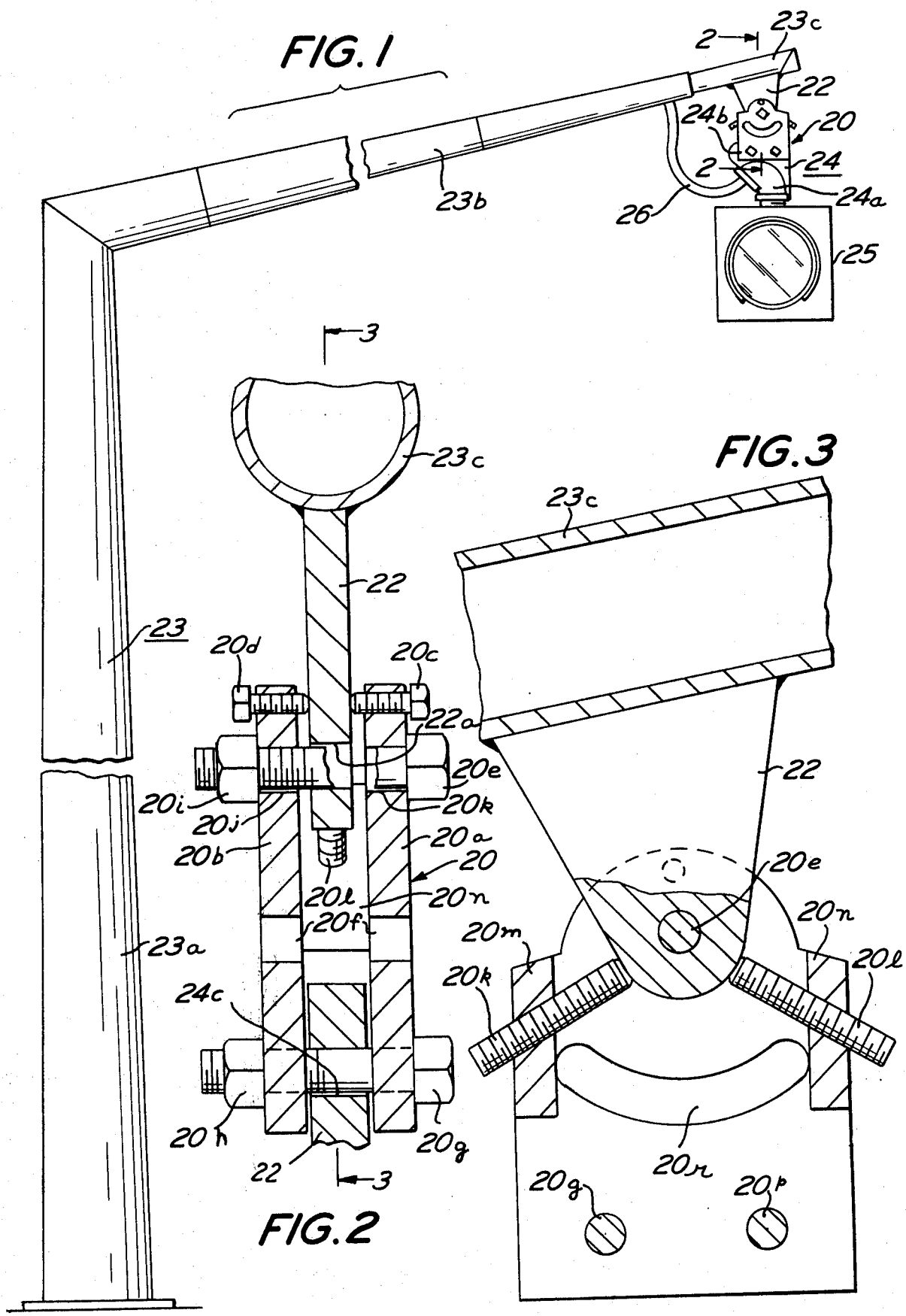

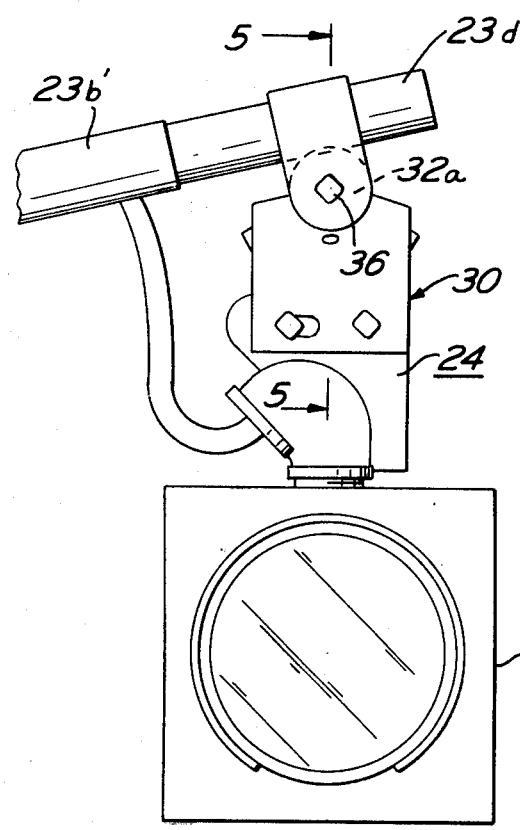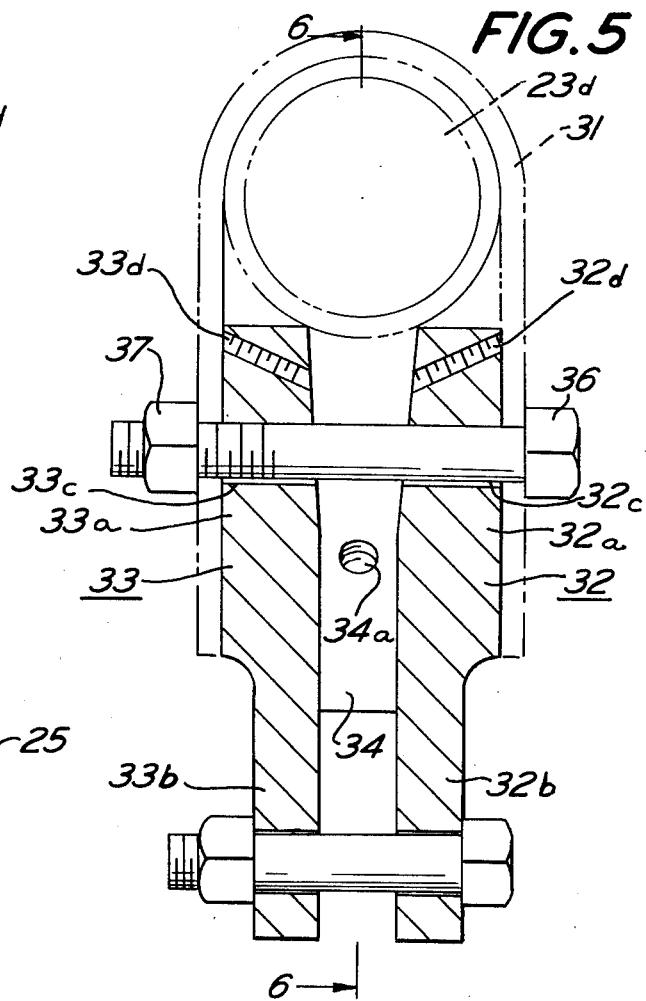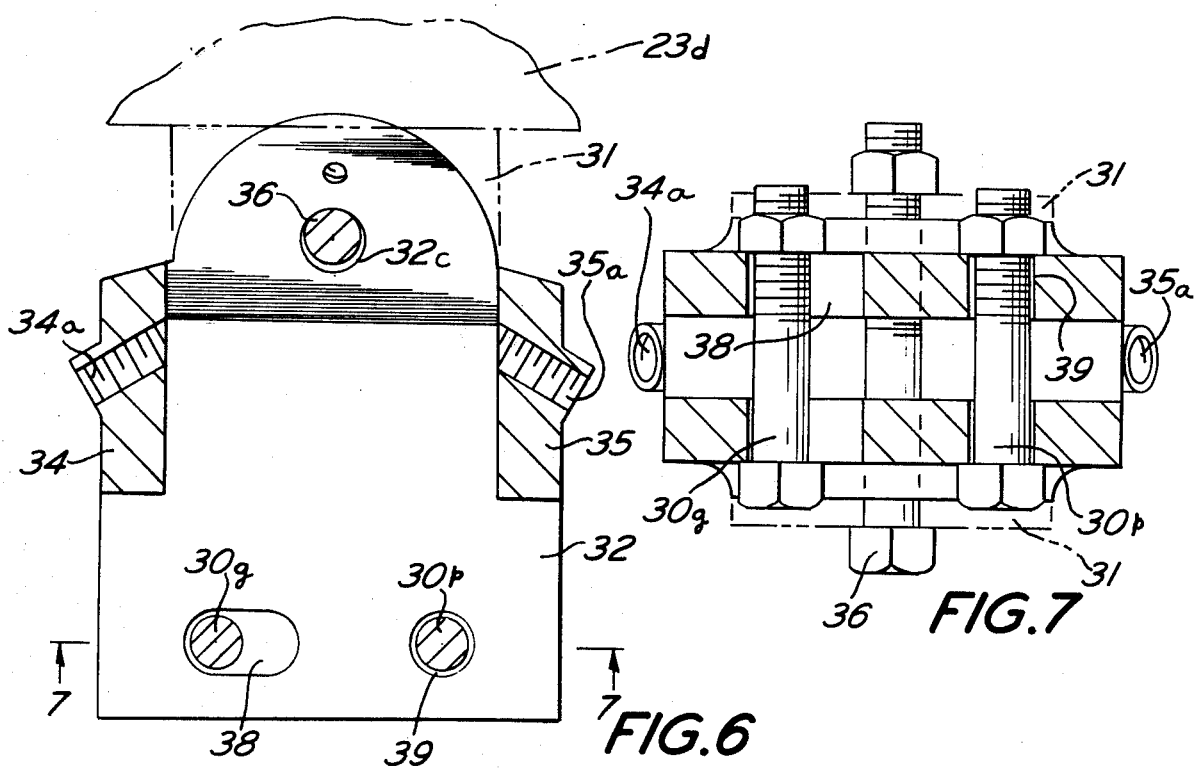

ADJUSTABLE FITTING FOR RIGID ATTACHMENT OF TRAFFIC SIGNALS TO MOUNTING MEMBERS

BACKGROUND OF THE INVENTION

1. Field of the Invention

This invention relates to apparatus for hanging traffic signal light assemblies or the like from mounting members and in particular to fittings constructed to effectively immobilize such signal assemblies when attached to said mounting members.

2. Prior Art

In the past, traffic light assemblies have been suspended from an overhanging, substantially horizontal rigid arm attached to a vertical post or pole. Often, the light assembly was attached by means of a clevis-type device to a depending, substantially planar tongue, a bolt being passed through transverse aligned apertures in the clevis and the tongue. Such suspending devices had the important disadvantage of permitting swinging pivotal movement of the assembly about the bolt when a high wind struck a side of the assembly. Moreover, such non-rigid attachment systems could be so driven by the wind from a different direction that the signal assembly could be turned about its longitudinal axis whereupon signal lights intended for a certain street would be either turned to face another street or to face a point between several streets thereby making for traffic accidents. Because of these possibilities, the Federal Government has recently begun a campaign to have all traffic signal assemblies rigidly attached to their mounting members thereby preventing movement in any direction.

BRIEF SUMMARY OF THE INVENTION

A hanger-fitting for attaching a traffic signal assembly or the like to a mounting member comprises two spaced, substantially parallel and planar upper rigid portions having an upper part for engaging the mounting member in a way such that movement of the fitting with respect to said mounting member is effectively prevented. Said hanger fitting also includes a lower part adapted to be coupled to said signal assembly.

BRIEF DESCRIPTION OF THE DRAWINGS

FIG. 1 is a front elevational-view of a hanger fitting in accordance with one form of the present invention as shown in a typical environment;

FIG. 2 is a sectional view of the fitting shown in FIG. 1 taken along the section line 2—2 therein;

FIG. 3 is a sectional view of the hanger fitting taken along section line 3—3 of FIG. 2 in the direction indicated;

FIG. 4 is a front elevational view of another form of the hanger fitting in a typical environment;

FIG. 5 is a sectional view of the form of the invention shown in FIG. 4 taken along the section line 5—5 of FIG. 4 in the direction indicated;

FIG. 6 is a sectional view of the form of the invention shown in FIG. 5 taken along the section line 6—6 of FIG. 5 in the direction indicated;

FIG. 7 is a sectional view of the apparatus depicted in FIG. 6 taken along the section line 7—7 in the direction indicated;

DETAILED DESCRIPTION OF THE DRAWINGS

Figure 8:
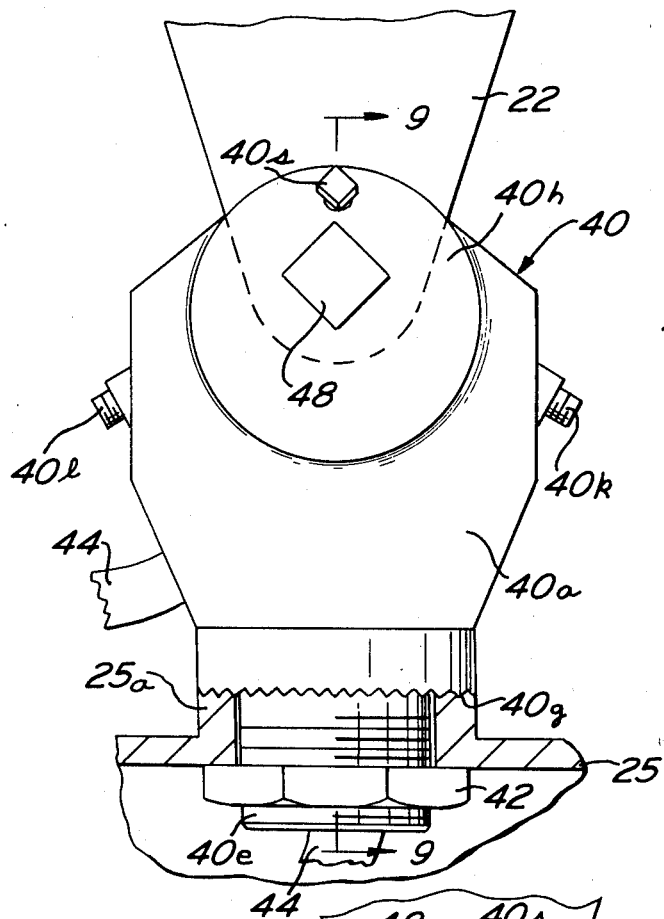
FIG. 8 is a third form of the present invention depicting in front elevational and partly sectional view a third embodiment of the present invention in a typical environment.

Referring to FIGS. 1–3, there is shown a mast-arm 23 comprising a vertical mast or post 23a attached at its top to a generally horizontal overhanging suspension arm 23b. At the end portion 23c of the arm, there is a substantially triangular, metal planar tongue 22 welded thereto. Attached to the tongue 22 by a bolt is the hanger fitting constructed in accordance with the present invention and indicated generally by the numeral 20. The form of the fitting shown in FIGS. 1–3 is especially adapted for use with presently available standard signal hanging components. Attached to the fitting 20 is a signal assembly comprising a standard adapting or intermediate member 24 having a generally planar portion 24b in which is formed an elongated horizontal slot 24c at its upper end. This slot is provided to permit the passage of bolts through it and the lower part of fitting 20 to couple it to the latter. Attached to the planar portion 24b is a curved tubular section 24a that has a lower threaded-pipe section which is screwed into the top of a traffic signal housing indicated for representational purposes at the numeral 25. The electrical wires 26 to the signal 25 are passed from the mast 23 through the tubular section 24a into the housing 25.

The fitting 20 comprises a metallic body which may be of cast aluminum, for example. Its upper part has two spaced, substantially parallel and planar rigid portions 20a and 20b, the space between them being partially occupied by the lower end of the tongue 22 which has an aperture 22a formed therein. A bolt 20e passes through aperture 22a which, is, in turn aligned with mutually aligned apertures 20k and 20j in the portions 20a and 20b, and is secured by a nut 20i or similar device.

Connecting portions 20a and 20b at their sides are two transverse side portions 20m and 20n, each of which contains upwardly and inwardly angled threaded passageways. Set screws 20k and 20l are screwed a desired distance into them until their inner ends contact the edge of the tongue 22 when the fitting 20 has been adjusted to the proper angle (i.e., when its vertical axis is perpendicular to the ground). This prevents pivotal movement of the fitting 20 about the bolt 20e.

The spaced portions 20a and 20b are also provided near their tops with aligned, transverse apertures through which adjusting bolts 20c and 20d are screwed, their inner ends touching opposite sides of the tongue 22. These screws are intended to permit adjustment and fixation of the angular position of the fitting 20 with respect to the tongue 22. When adjusted they maintain the fitting 20 truly vertical despite any deviation of the plane of the tongue 22 from the vertical. Consequently the fitting 20 is rigidly fixed to the tongue 22 and is kept from moving in either of two orthogonal directions by the pairs of set screws 20k, 20l and 20c, 20d. This prevents swinging of the signal assembly and possible mis-positioning of it by the wind.

The lower parts of the spaced members 20a and 20b are also spaced from one another and contain, respectively, two sets of aligned transverse apertures through which two cap screws 20g and 20p are passed, being secured by nuts at their outer ends such the nut 20h for the screw 20g. These bolts, as shown in FIG. 2 also are passed through the horizontal, elongated slot 24c in the intermediate member 24 after it has been adjusted to its proper position left-to-right vis-a-vis fitting 20. The lower, pipe-end section of the tubular portion 24a is passed through a passageway (not shown) formed in the top of the housing of the traffic signal 25 and is secured thereto by a nut or similar fastening device, for example.

The arcuate slot 20r identically formed in both portions 20a and 20b may be used when the fitting is to be mounted to the end of the arm 23b by means of a strap curved over and attached to the arm in a generally inverted U-shaped arrangement. If this is employed it is necessary to cover both outer surfaces of the fitting with adaptor plates because the front-to-back thickness of the fitting 20 is much smaller than the diameter of the pole end over which the strap hangs. These plates (not shown) are generally rectangular metal pieces having an upper and a lower hole. The upper holes are aligned with the single set of aligned holes at the lower ends of the strap and then a bolt is passed through all four sides and secured by a nut, for example. The lower holes of the adaptor plate are aligned with slots 20r and a bolt is passed through them and secured. Then the horizontal slot in the intermediate member is aligned with the apertures in the lower part of fitting 20 through which bolts 20g and 20p are passed and secured.

Second Embodiment (FIGS. 4–7 and 11)

FIGS. 4–7 and 11 show another form of the present invention. In this case, the fitting indicated generally at 30 can easily be suspended from the overhanging arm in several different ways. In FIG. 4, the fitting 30 is shown held by a clamp 31 around the tenon end 23d of an arm 23b' which is attached to the vertical mast 23a in the usual fashion. However, the tenon 23d does not have any depending tongue 22 attached to it as in FIGS. 1–3. Instead, the U-shaped metallic clamp or strap 31 is curved around the circumference of the tenon 23d and fixed thereto by welding, for example. It has at least one set of aligned apertures formed therein which the bolt 36 can pass. The fitting 30 in this case is somewhat similar to the fitting 20 shown in FIGS. 1–3 as it consists of two generally parallel, rigid portions 32 and 33 joined at their sides by transverse portions 34 and 35. The portions 32, 33 and 34, 35 may be formed integrally by casting, for example. The respective upper parts 32a and 33a of portions 32 and 33 are thicker than their lower portions 32b and 33b as shown in FIG. 5 and are generally circular as seen from the left or right of the fitting as positioned as shown in FIG. 5. The thicker portions 32a and 33a have respective aligned apertures 32c, 33c through which the bolt 36 is passed being secured at its end by the nut 37, for example. These thicker circular portions are to enable engagement by strap 31 without resorting to the use of the two adaptor plates mentioned in connection with the embodiment of FIGS. 1–3 when suspended by a strap rather than by a tongue.

Figure 11:
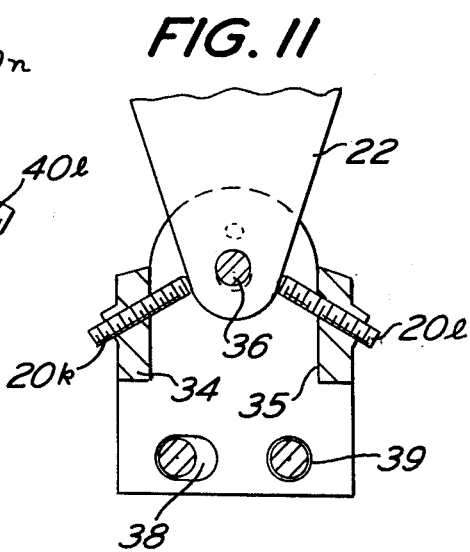
FIG. 11 is a partly sectional view of the form of the invention shown in FIGS. 4–7 employed in a different system of attachment to the mounting member.

Portions 32a and 33a are likewise equipped with transverse downwardly and inwardly angled threaded holes 32d, 33d, respectively which may be equipped with set screws similar to the screws 20k and 20l shown in the embodiment of FIG. 1. However, these screws would be used only when the fitting 30 is used with a depending tongue as shown in FIG. 11 and for the same purpose as the screws 20k and 20l. In the embodiment of FIGS. 4–7, the threaded bores 32d and 33d are angled as shown to allow greater space around the head of the bolt 36 thereby enabling easier tightening thereof by a wrench.

The transverse portions 34 and 35 are likewise equipped with angled, threaded apertures 34a and 35a through which set screws similar to the set screws 20k and 20l of FIGS. 1–3 may be screwed to engage a depending tongue when this form of the invention is used with the kind of arm termination. The outer ends of the passages 34a, 35a may be bevelled in conventional fashion to enable easier engagement of the set screws with the threads thereof.

The lower portions 32b, 33b are provided with two sets of aligned apertures 38, 39, the set 38 being somewhat elliptical to permit further sideways and upward adjustment of the intermediate adapter 24. Bolts 30d, 30b are passed through them and through the slot 24c of the member 24 and are secured at their other ends by nuts as shown.

FIGS. 8–10

Figure 9:
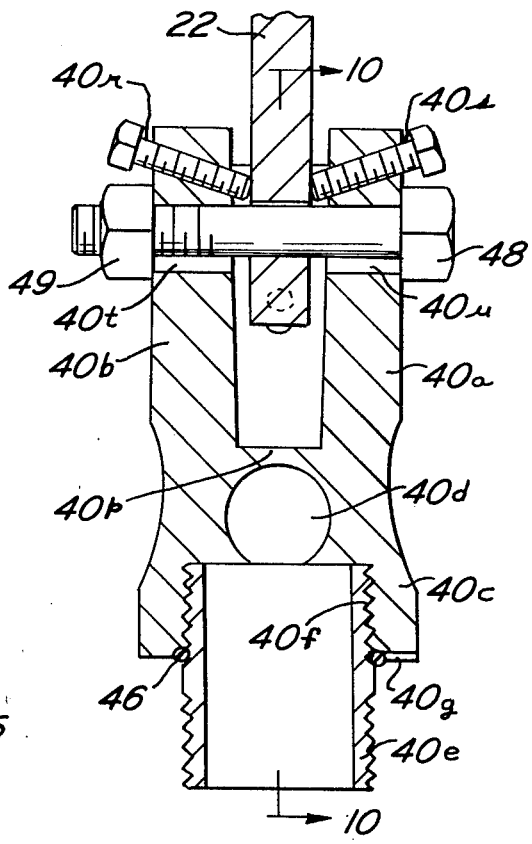
FIG. 9 is a sectional view of the embodiment shown in FIG. 8 taken along the section line 9—9 in the direction indicated.
Figure 10:
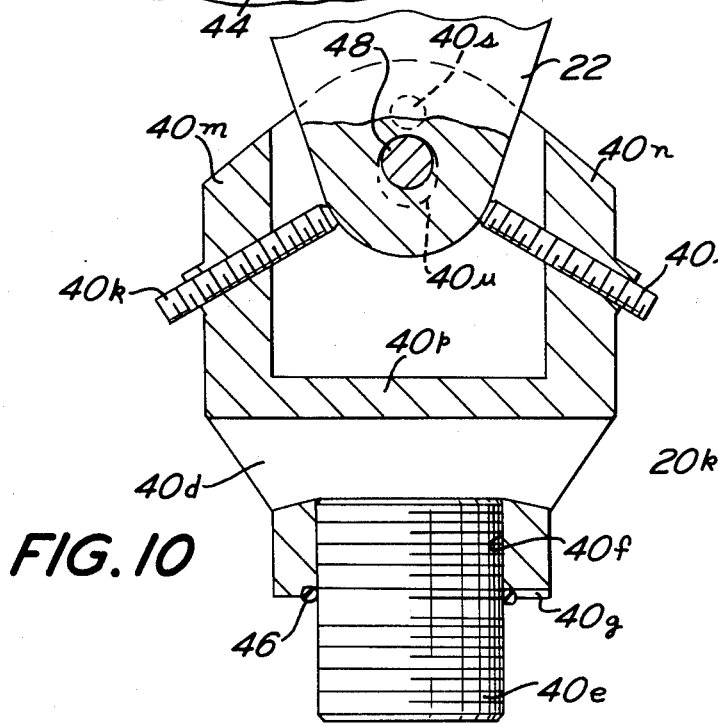
FIG. 10 is a sectional view of the embodiment shown in FIG. 9 taken along the section line 10—10 therein.

FIGS. 8–10 illustrate a third form of the invention which, because of its shorter overall height, saves 5 or 6 inches and therefore is useful for new installations where higher clearances for the traffic light signal assembly are desired. The third embodiment, depicted generally at the numeral 40, enables the light assembly 25 to be suspended directly from the tongue 22 instead of using the intermediate member 24 as in the previous embodiments. Like the previous embodiments, it has a bifurcated upper portion comprising parts 40a and 40b. Its lower portion 40c is integral with the upper portions 40a and 40b and also includes a passageway 40d through which wires for the traffic signal assembly may be passed. A vertical hole in the center of the lower wall of the passageway 43 brings the passageway 40d and a lower mounting pipe or nipple 40e into communication with one another. The pipe 40e is screwed into (or otherwise attached) to a correspondingly threaded socket 40f formed in the center of the lower end of the fitting 40. The attachment of the two can be effected during the casting of the fitting 40, if desired. The lower annular area 40g of the lower end is formed with a plurality of serrations which, when the member 40e is passed through an opening in the top of the traffic assembly housing 25, mate with corresponding serrations formed in the upper end of the signal assembly housing 25a. The pipe 40e is secured to the housing 25 by means of a nut 42 or other similar device. The supply wire or cable 44 is shown passing laterally into the fitting 40 via passageway 40d, via the vertical hole formed in the center thereof which communicates with the interior of 40e, and thence down to the actual signal light itself. A moisture-proof seal is effected between the serrated lower annular portion 40g and the mating portion 25a by a compressible washer or O-ring 46 which may be made of Neoprene, for example.

The upper portions 40a and 40b are joined by transverse portions 40m and 40n and the horizontal portion 40p which connects them. Formed in the portions 40m and 40n are two threaded upwardly-angled apertures in which two set screws 40k and 40l are respectively screwed. These screws engage an edge surface of the tongue 22 in the same manner as their counterparts 20k and 20l in the embodiment of FIGS. 1–3. Another pair of cap screws 40r and 40s are respectively screwed into downwardly and inwardly-angled threaded apertures in the sections 40b and 40a to permit fixed adjustment of the position of the traffic signal assembly in a direction generally perpendicular to the plane of the tongue 22. The entire assembly 40 is hung from the tongue 22 by means of a horizontal bolt 48 passed through two aligned, unthreaded apertures 40t and 40u formed in the portions 40b and 40a respectively. The bolt 48 is secured by a nut 49. The apertures 40t and 40u do not have a completely circular cross-secton as may be seen from FIG. 10. This allows an adjustment of 3°–5° in the position of the fitting 40 permitting it to compensate for whatever deviation the tongue 22 may have from the true vertical position. The fitting 40 is also equipped with raised exterior circular areas such as the area 40h shown in FIG. 8. These areas enable the fitting 40 to be suspended by a U-shaped strap such as the strap 31 shown in FIG. 5 when it is to be hung from the end of a suspension arm or a part of it not equipped with a tongue 22.

It should be appreciated that the invention could also take the form wherein the two parallel upper portions 32, 33 (FIG. 5) are joined together with no intervening space, there being a hole drilled transversely through the single upper portion. If this single upper portion were sufficiently thick and were to have outside surfaces such as the circular areas 32 and 33 (FIG. 5), this fitting could be placed within the strap 31 (FIG. 5) and when the bolt 36 is fastened, this type of fitting would be equivalent to the rigid fitting 30 shown in FIGS. 4–7. Alternatively, the embodiment of FIG. 9 could likewise be modified by making the upper portions 40a and 40b into a single piece, just wide enough to bear against the inside lower surfaces of a strap such as the strap 31 of FIG. 5. In this form, then, the lower tubular pipe portion 40e would engage the housing of the signal light itself.

The invention as shown, takes many forms and still other embodiments which do not depart from the essence thereof may occur to one skilled in the art upon perusing the specification and figures herein. Consequently, the invention should be limited solely by the claims herein.

What is claimed is:

1. A hanger fitting for attaching a traffic signal assembly or the like to a mounting member comprising:
    a. two spaced, substantially parallel and generally planar rigid portions each of said portions having
        i. a transverse aperture aligned with a corresponding aperture in the other portion, and
        ii. means for enabling engagement of said mounting member thereby to prevent movement of said fitting with respect to said member in at two substantially mutually perpendicular directions,
    b. an intermediate portion coupled to said rigid portions which joins said rigid portions at their sides, and
    c. a lower portion coupled to said intermediate portion which includes means adapted to be coupled to said signal assembly.

2. The fitting according to claim 1 wherein said (a) (ii) means is adapted to prevent movement of said fitting in a direction generally parallel to the axis passing through said two transverse apertures.

3. The fitting according to claim 1 wherein said (c) portion includes means comprising two spaced, substantially parallel and generally planar rigid portions having at least a single set of aligned transverse apertures adapted to be fastened by fastening means inserted through them.

4. The fitting according to claim 1 wherein said (e) portion includes a lower, downwardly-projecting terminal portion disposed substantially perpendicularly to the axis of said aligned transverse apertures.

5. The fitting according to claim 4 wherein said lower terminal portion is generally tubular.

6. The fitting according to claim 5 wherein said tubular portion is threaded on its external surface.

7. The fitting according to claim 3 wherein said (c) portion includes at least two sets of said aligned, transverse apertures.

8. The fitting according to claim 1 wherein said (a) (ii) means are disposed above said (i) apertures.

9. The fitting according to claim 8 wherein said (a) (ii) means comprises two threaded apertures opposite one another equipped with respective set screws for engaging the sides of said mounting member.

10. The fitting according to claim 9 wherein said apertures in said (a) (ii) means are aligned with one another.

11. The fitting according to claim 8 wherein said (a) (ii) means comprises two oppositely facing set screw mounts equipped with respective set screws positioned at an angle extending upwardly towards said (i) apertures, said mounts lying in a plane generally perpendicular to the axis of said (i) apertures.

12. The fitting according to claim 1 wherein said (a) rigid portions include upper regions having a thickness greater than the thickness of said lower parallel rigid portions.

13. The fitting according to claim 12 wherein said upper regions of increased thickness are generally circular.

14. The fitting according to claim 1 wherein said (a) rigid portions are joined at their sides by substantially transverse rigid portions and wherein said (ii) means includes threaded apertures extending through said transverse portions.

15. The fitting according to claim 14 wherein said (a) (ii) means also includes two generally transverse apertures formed in said (a) rigid portions, each aperture being opposite the other and being angled downwardly and inwardly toward the space between said (a) rigid portions and further includes oppositely disposed set screws which threadedly engage said last-named apertures.

16. The fitting according to claim 1 wherein said (b) portion includes a passageway below said (a) rigid portions through which electrical conductors may be passed for carrying current to said signal assembly.

17. The fitting according to claim 5 wherein the axis of said passageway is generally parallel to the horizontal axis of the space between said (a) rigid portions and said passageway communicates with the bore of said tube-like member.

18. The fitting according to claim 4 wherein said (b) lower portion includes a generally annular serrated lower edge adapted to mate with a corresponding serrated surface of a housing for a traffic signal assembly.

19. The fitting according to claim 18 with the addition of yieldable sealing means adjacent said serrated means.

20. A hanger fitting for attaching a traffic signal assembly or the like to a mounting member comprising:
 a. an upper rigid portion provided with a transverse aperture through it,
 b. an intermediate rigid portion connected to said upper rigid portion, and
 c. a lower rigid portion which includes means adapted to be coupled to said signal assembly thereby to prevent appreciable movement of said assembly with respect to said lower portion all of said (a), (b) and (c) positions being integral with one another.

21. The fitting according to claim 20 wherein said lower portion includes two spaced, essentially parallel members provided with a plurality of sets of transverse aligned apertures, the space between them having an axis generally perpendicular to the axis of the aligned apertures in said upper portion.

22. The fitting according to claim 20 wherein said lower portion comprises an essentially vertical projecting tubular member.

23. A hanger fitting for attaching a traffic signal assembly or the like to a mounting member comprising:
 a. two spaced, substantially parallel and generally planar rigid portions each of said portions having
  i. a transverse aperture aligned with a corresponding aperture in the other portion,
  ii. means for enabling engagement of said mounting member thereby to prevent movement of said fitting with respect to said member in at least one of two substantially mutually perpendicular directions, said means comprising two threaded apertures opposite one another equipped with respective set screws for engaging the sides of said mounting member,
 b. an intermediate rigid portion which joins said (a) rigid portions at their sides, and threaded apertures generally transverse to said (a) rigid portions which extend through said intermediate rigid portions, and
 c. a lower portion which includes means adapted to be coupled to said signal assembly, said lower portion including means comprising two spaced, substantially parallel and generally planar rigid portions having at least a single set of aligned transverse apertures adapted to be fastened by fastening means inserted through them.

24. The hanger according to claim 1 wherein said (a) (b) and (c) portions are integrally formed.

* * * * *